United States Patent [19]

Matsumoto

[11] Patent Number: 4,465,029
[45] Date of Patent: Aug. 14, 1984

[54] REINFORCED CRANKCASE FOR AN INTERNAL COMBUSTION ENGINE WITH A BALANCER SHAFT

[75] Inventor: Yukio Matsumoto, Shizuoka, Japan

[73] Assignee: Yamaha Hatsudoki Kabushiki Kaisha, Iwata, Japan

[21] Appl. No.: 380,889

[22] Filed: May 21, 1982

[30] Foreign Application Priority Data

May 25, 1981 [JP] Japan ................................ 56-78026

[51] Int. Cl.³ .......................... F02B 75/06; F16C 3/04
[52] U.S. Cl. ............................. 123/195 A; 123/195 S; 123/192 R; 123/192 B; 74/606 R; 74/603
[58] Field of Search .......... 123/192 R, 192 B, 195 A, 123/195 S; 74/606 R, 603

[56] References Cited

U.S. PATENT DOCUMENTS

| | | | |
|---|---|---|---|
| 1,347,477 | 7/1920 | Allyne et al. | 123/195 S |
| 3,616,786 | 11/1971 | Hatz | 123/192 B |
| 3,962,932 | 6/1976 | Okamoto et al. | 123/192 B |

Primary Examiner—Craig R. Feinberg
Assistant Examiner—David A. Okonsky
Attorney, Agent, or Firm—Donald D. Mon; David O'Reilly

[57] ABSTRACT

An internal combustion engine includes a crankshaft and a balancer shaft. The shafts are rotationally linked to one another, and the crankshaft is linked to a piston The shafts carry weights to minimize the vibrations caused by the reciprocating motion of the piston. A reinforcing member has two enclosing portions, one for a bearing of each of the shafts, and integrally joins both of said enclosing portions. The reinforcing member is cast into the crankcase wall. Its material is stronger than the material of which the crankcase wall is made. Cracking and wearing of the crankcase wall, especially in the region between the two shafts, is reduced or eliminated, and the wall can be made thinner, and more reliably without cavities.

5 Claims, 4 Drawing Figures

REINFORCED CRANKCASE FOR AN INTERNAL COMBUSTION ENGINE WITH A BALANCER SHAFT

FIELD OF THE INVENTION

This invention relates to internal combustion engines, and more particularly to crankcase structures for internal combustion engines of the type which include a crankshaft and a balance shaft, wherein these shafts rotate around parallel axes.

BACKGROUND OF THE INVENTION

The present invention relates to a structure for the crankcase of an internal combustion engine which is equipped with a balancer shaft that rotates parallel to a crankshaft.

In a reciprocating piston type internal combustion engine, generally speaking, there are generated vibrations of a first order which result from the reciprocations of the piston. In order to eliminate these first order vibrations, there has been adopted the concept of laying a balancer shaft parallel to the crankshaft and turning it at the same speed as, but in the opposite direction to, the crankshaft and integrate in the balancer shaft a balance weight having a suitable shape such as a sector shape. However, since an internal combustion engine equipped with such balancer shaft has its crankshaft and balancer shaft revolving in the opposite directions to each other, tensile and compressive loads are repeatedly applied to the crankcase walls which are interposed between the bearing portions of the crankshaft and the bearing portions of the balancer shaft. These repeated tensile and compressive loads may cause cracks in the crankcase walls. In order to cope with this, the prior art tends to make these wall portions thicker. However, not only do the thicker walls necessarily enlarge the size of the internal combustion engine, but also there is a limit to the wall thickness in case the compressive and tensile loads are high. If excessively thick walls are formed, there arises the risk that cavities are liable to be formed in the crankcase (which is made of an aluminum die casting).

The present invention has been conceived in view of the background thus far described and has as an object to provide a crankcase for an internal combustion engine having a balancer shaft, which can withstand repeated high compressive and tensile loads without making the walls of the crankcase thicker, and which is so constructed as to be free from any formation of cavities.

BRIEF DESCRIPTION OF THE INVENTION

In order to achieve the aforementioned object, specifically, the present invention is characterized in that there is cast in the wall of the crankcase a reinforcing member which has enclosing portions that enclose a bearing of the crankshaft and a bearing of the balancer shaft at at least one end thereof and which is made integral with both of these enclosing portions.

According to a preferred but optional feature of this invention, such a reinforcing member is provided at both ends of the shafts.

BRIEF DESCRIPTION OF THE DRAWINGS

The above and other features of this invention will be fully appreciated from the following detailed description and the accompanying drawings, in which.

DETAILED DESCRIPTION OF THE INVENTION

Figure 1:
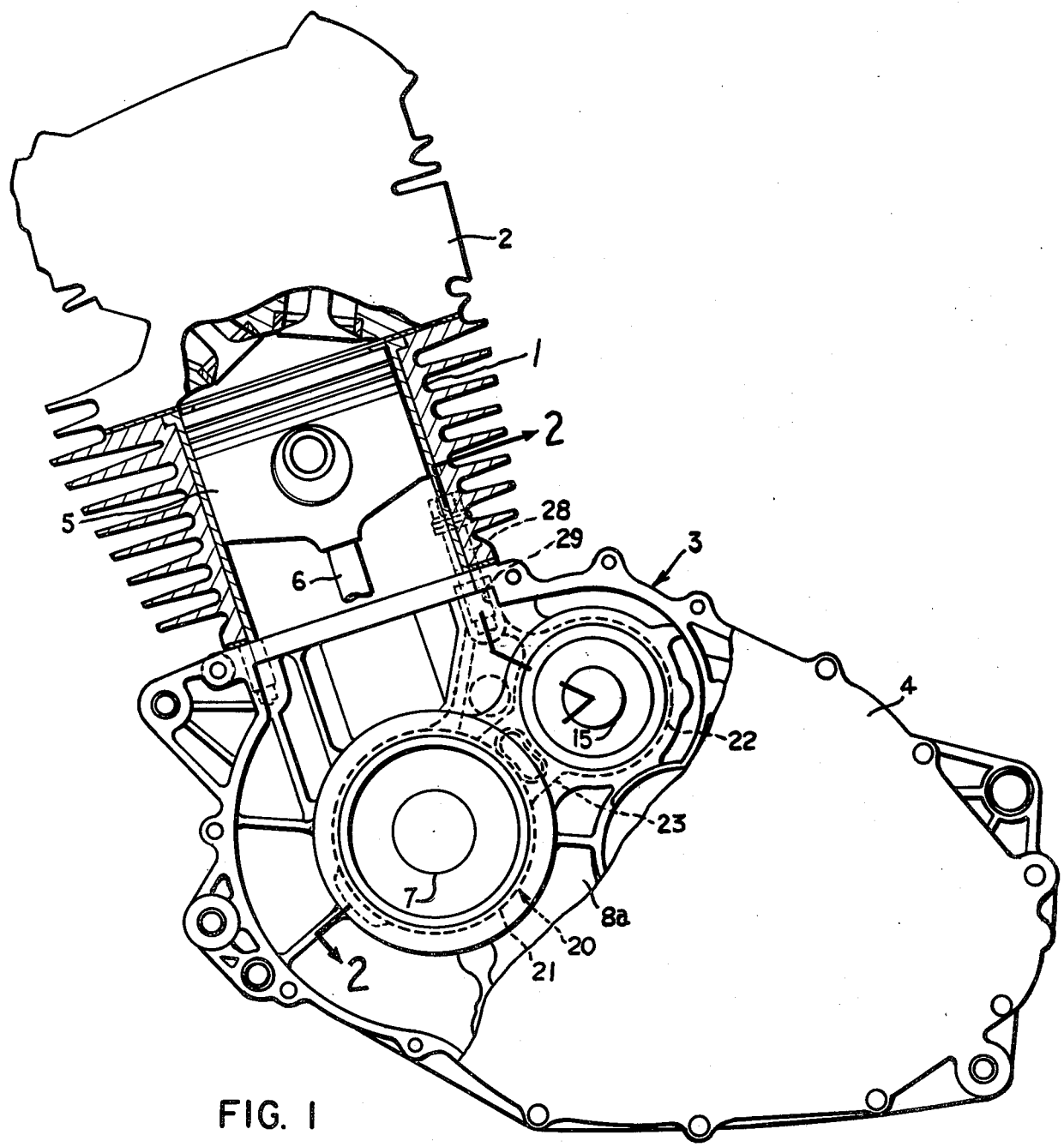
FIG. 1 is a side elevation showing the internal combustion engine in partial section.
Figure 2:
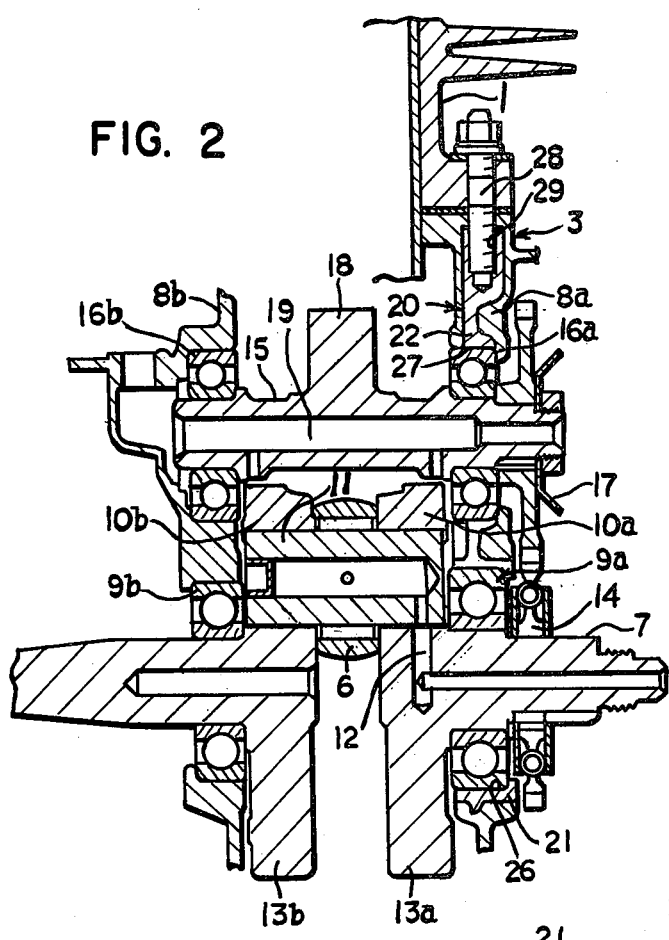
FIG. 2 is a section taken along line II—II in FIG. 1.

In the drawings, reference numeral 1 indicates a cylinder; numeral 2 a cylinder head; numeral 3 a transversely split crankcase; and numeral 4 a crankcase cover. In the aforementioned cylinder 1, there is fitted a piston 5, which is connected through a connecting rod 6 to a crankshaft 7. Crankshaft 7 has both its ends borne, as shown in FIG. 2, in both the side walls of crankcase 3, which is made of an aluminum die casting, by means of bearings 9a and 9b. At the center portion of crankshaft 7, there are integrally formed crank arms 10a and 10b, to which is linked a crank pin 11 at an eccentric position from crankshaft 7. To crank pin 11, there is connected the larger end portion of connecting rod 6. An oil passage 12 is provided for lubricating the slidably contacting portions between crank pin 11 and connecting rod 6.

Crank arms 10a and 10b are integrally formed with balancing mass members 13a and 13b which are positioned at opposite positions to crank pin 11 with respect to the axis of crankshaft 7. Balancing mass members 13a and 13b have their masses and distances from the axis of the crankshaft 7 so set as to generate an opposite inertia which corresponds to an inertia which is prepared by summing the inertia resulting from the rotating masses of the crank pin, the larger end portion of the connecting rod, and so on, plus 50% of the inertia (at the top and bottom dead centers) resulting from the reciprocating mass of piston 5, and so on.

To one end of crankshaft 7, there is fixed a drive gear 14 that revolves with the crankshaft.

To crankcase 3, there is mounted a balancer shaft 15, parallel to crankshaft 7. Balancer shaft 15 has both of its end portions supported through bearings 16a and 16b disposed respectively in side walls 8a and 8b of crankcase 3. One end of balancer shaft 15 is equipped with a follower gear 17 which is in meshing engagement with drive gear 14. Follower gear 17 has the same diameter and tooth count as those of drive gear 14 so that balancer shaft 15 rotates at the same speed as, but in the opposite direction to, crankshaft 7. Balancer shaft 15 is integrally equipped with a balance weight 18 at its center portion. Balance weight 18 is formed into a sector shape, for example, (although not shown in detail) so as to establish such an inertia at the top and bottom dead centers as corresponds to 50% of the inertia resulting from the reciprocating mass of the piston and so on. In the engine under consideration, therefore, 100% of the inertia resulting from the reciprocating mass at the top and dead centers is divided into two 50% portions, which are shared between balancing mass members 13a and 13b and balance weight 18, so that the former is balanced by the latter. Moreover, balancer shaft 15 is formed along its axis with a breather passage 19, which has one of its ends communicating with the inside of the crankcase and its other end vented to the atmosphere, thereby to release the pressure fluctuations in the crankcase to the atmosphere by way of breather passage 19.

A reinforcing member 20 according to the present invention is cast in one side wall 8a of crankcase 3.

Figure 4:
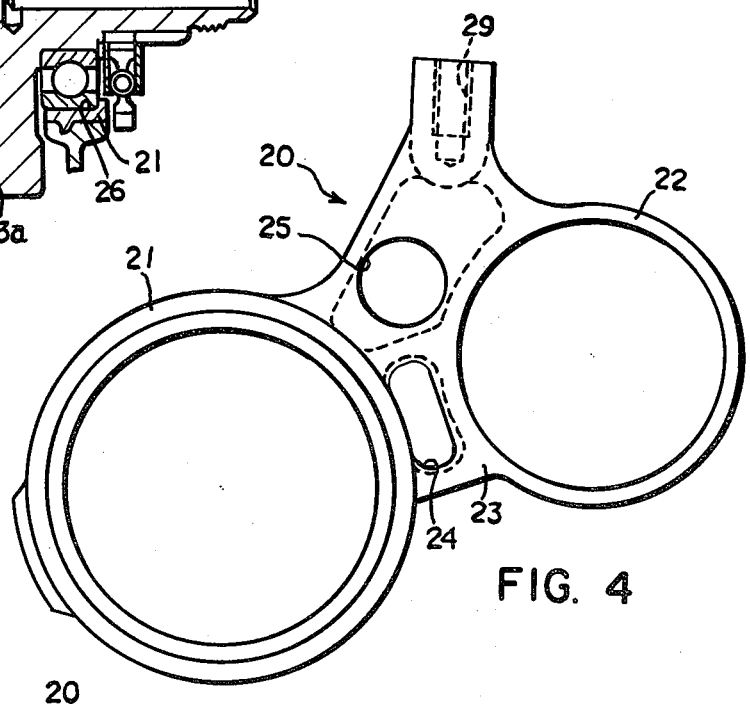
FIG. 4 is a side elevation of FIG. 3.
Figure 3:
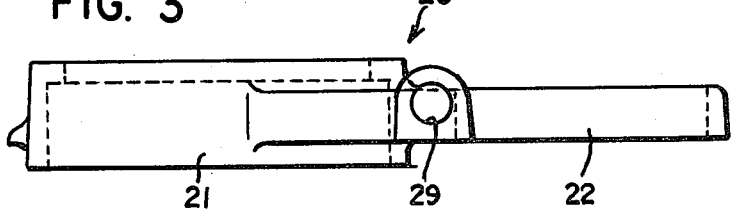
FIG. 3 is a top plan view showing the reinforcing member.

Reinforcing member 20 is made of a harder material than that of crankcase 3. For example, crankcase 3 is made of aluminum or an aluminum alloy, whereas reinforcing member 20 is made of cast iron. As shown in FIGS. 3 and 4, reinforcing member 20 is constructed to include: a first annular enclosing portion 21, which encloses and supports bearing 9a of crankshaft 7; a second annular enclosing portion 22, which encloses and supports bearing 16a of balancer shaft 15; and connecting wall portion 23 which integrally connects enclosing portions 21 and 22. Holes 24 and 25 are formed in connecting wall portion 23.

First and second enclosing portions 21 and 22 are positioned, as can be seen in FIG. 2, directly to embrace the outer races of bearings 9a and 16a, respectively, and the embracing (abutting) surfaces 26 and 27 are finished by a cutting process after the reinforcing member is cast in place. Moreover, connecting wall portion 23 has a portion extending to the connecting portion between crankcase 3 and cylinder 1. It has formed therein a threaded hole 29 for screwing a stud bolt 28 into it. As a result, when cylinder 1 and crankcase 3 are to be connected to each other by means of the stud bolt 28, bolt 28 is screwed in the hard reinforcing member 20 so that cylinder 1 and crankcase 3 can firmly be connected.

According to the embodiment having the construction thus far described, if crankshaft 7 is revolved in one direction during the operation of the engine, the balancer shaft 15 is revolved at the same speed as, but in the opposite direction to, crankshaft 7. When piston 5 is at its top dead center, balancing mass member 13a and 13b of crank arms 10a and 10b and the balance weight of balancer shaft 15 are positioned at the bottom dead centers in the rotational direction, thereby to eliminate the inertia of the reciprocating mass of piston 5 and so on. When piston 5 is at its bottom dead center, on the other hand, both the aforementioned balancing mass members 13a and 13b and balance weight 18 are positioned at their top dead centers, as viewed in the rotational direction, thereby to eliminate the inertia of the reciprocating mass.

When piston 5 is at an intermediate position between the top and bottom dead centers, balancing mass members 13a and 13b and balance weight 18 approach and leave each other, because crankshaft 7 and balancer shaft 15 are being revolved in opposite directions to each other. As a result, when balancing mass members 13a and 13b and balance weight 18 come closer to each other, a compressive load is applied to said walls 8a and 8b of crankcase 3, whereas when the same move apart from each other, a tensile load is applied thereto.

In the case of the aforementioned embodiment, however, since reinforcing member 20 is cast in one side wall 8a of the crankcase 3, the aforementioned tensile and compressive loads are borne by that reinforcing member 20. More specifically, reinforcing member 20 bears the tensile load and the compressive load, respectively, at its first enclosing portion 21, which encloses bearing 9a of crankshaft 7, and at second enclosing portion 22 which encloses bearing 16a of the balancer shaft 15. However, since those two enclosing portions 21 and 22 are integrally connected by means of the connecting wall portion 23, the aforementioned tensile and compressive loads are borne by connecting wall portion 23. Reinforcing member 20 does not involve a risk of cracking, because it has a greater rigidity than aluminum or its alloys. As a result, crankcase 3 made of aluminum or an aluminum alloy can have its side wall 8a made thin so that its size can be reduced, at the same time preventing any cavity from being formed in it.

Moreover, since reinforcing member 20 is formed with threaded hole 29 for stud bolt 28, the fastening torque of the stud bolt 28 can be increased, thereby to improve the joint strength between cylinder 1 and crankcase 3.

Since first enclosing portion 21 and the second enclosing portion 22 directly abut against the outer races of bearings 9a and 16a, side wall 8a is prevented from being worn, even if the outer races undergo minute vibrations during the running operation of the engine.

In the embodiment thus far described, reinforcing member 20 is cast in only one side wall 8a of crankcase 3, but the present invention should not be limited thereto. It can be modified such that separate reinforcing members are cast in both side walls 8a and 8b.

As has been described hereinbefore, according to the present invention, there is cast in the wall of the crankcase a reinforcing member which encloses the bearing portions of a crankshaft and the bearing portions of a balancer shaft, and which integrally joins both of the enclosing portions. As a result, the tensile and compressive loads that are applied to the walls of the crankcase are borne on that reinforcing member. As a result, the crankcase can have its strength improved to be prevented from cracking. Since the crankcase can have its walls made thinner, there can be attained other advantages, for example that the crankcase can enjoy a smaller size, and that cavities will be prevented from being formed in the crankcase casting.

This invention is not to be limited by the embodiments shown in the drawings and described in the description, which are given by way of example and not of limitation, but only in accordance with the scope of the appended claims:

I claim:

1. In an internal combustion engine of the type which includes a cylinder, a piston slidable in said cylinder, a crankcase having a wall, a crankshaft and a balance shaft, each shaft carrying respective eccentric weights and rotatable around axes which are parallel to one another, said piston being linked to said crankshaft, and said crankshaft and balance shaft being linked together for simultaneous rotation, bearing means on each of said crankshaft and balance shaft rotationally mounting them to said crankcase wall, the improvement comprising: a reinforcing member made of a stronger material than that of said crankcase wall, said reinforcing member comprising an enclosing portion for embracing and enclosing the bearing means of each of said shafts, with a connecting wall portion joining said enclosing portions to one another, said reinforcing member being cast into said crankcase wall, said connecting wall portion resisting compressive and tensile forces exerted on said reinforcing member as a consequence of rotation of said shafts.

2. Apparatus according to claim 1 in which said crankcase wall is made of a material selected from a group consisting of one of aluminum and aluminum alloy, and said reinforcing member is made of an iron alloy.

3. Apparatus according to claim 1 in which said reinforcing member includes a threaded hole to receive a cylinder hold down bolt.

4. Apparatus according to claim 1 in which two of said reinforcing members are provided, one at both ends of said shafts.

5. Apparatus according to claim 4 in which said crankcase wall is made of a material selected from a group consisting of one of aluminum and aluminum alloy, and said reinforcing member is made of an iron alloy.

* * * * *